United States Patent

[11] 3,598,000

| [72] | Inventor | Konrad Emil Meissner<br>Lafayette, Calif. |
|---|---|---|
| [21] | Appl. No. | 824,789 |
| [22] | Filed | May 15, 1969 |
| [45] | Patented | Aug. 10, 1971 |
| [73] | Assignee | Filper Corporation<br>San Ramon, Calif. |

[54] INDEX ASSEMBLY
2 Claims, 10 Drawing Figs.

[52] U.S. Cl. .......... 74/822, 74/827
[51] Int. Cl. .......... B23b 29/32
[50] Field of Search .......... 74/822, 827, 817, 816, 813, 823, 125

[56] References Cited
UNITED STATES PATENTS

| 2,318,619 | 5/1943 | Noel | 74/822 UX |
| 2,386,432 | 10/1945 | Bullock | 74/822 |
| 2,736,204 | 2/1956 | Hill | 74/125 |
| 2,826,099 | 3/1958 | Scholin et al. | 74/822 |

FOREIGN PATENTS

| 638,553 | 10/1936 | Germany | 74/823 |

Primary Examiner—William F. O'Dea
Assistant Examiner—F. D. Sheomaker
Attorney—Boyken, Mohler, Foster and Schwab ABSTRACT: An index assembly including a camshaft continuously driven at a uniform rate, having an index-actuating cam and an index-locking cam secured thereon, and an indexing disc is secured on a work shaft that is separate from said camshaft. Said indexing disc is formed with radially outwardly opening equally spaced recesses, and separate index-moving and index-locking elements or plungers operatively connected with said index-actuating cam and with said index-locking cam, respectively, for positive reciprocable movement into and out of separate of said recesses and for rotation of said indexing disc and work shaft through part of each 360° rotation of said camshaft under the influence of movement of said index-actuating cam and movement of said index-locking cam, said indexing disc being positively engaged by said index-moving and index-locking plungers against movement relative to said disc circumferentially of the latter in either of two opposite directions when in engagement with the latter. A control member connects the separate operative connections between said index-actuating cam and said index-moving plunger, and between said index-locking cam and said index-locking plunger, for simultaneous opposite reciprocable movement of said plungers into and out of said recesses under the influence of movement of said index-locking cam to insure alternate locking and release of said indexing disc.

Patented Aug. 10, 1971

INVENTOR
KONRAD EMIL MEISSNER
By Boyken, Mohler, Foster & Regan
ATTORNEYS

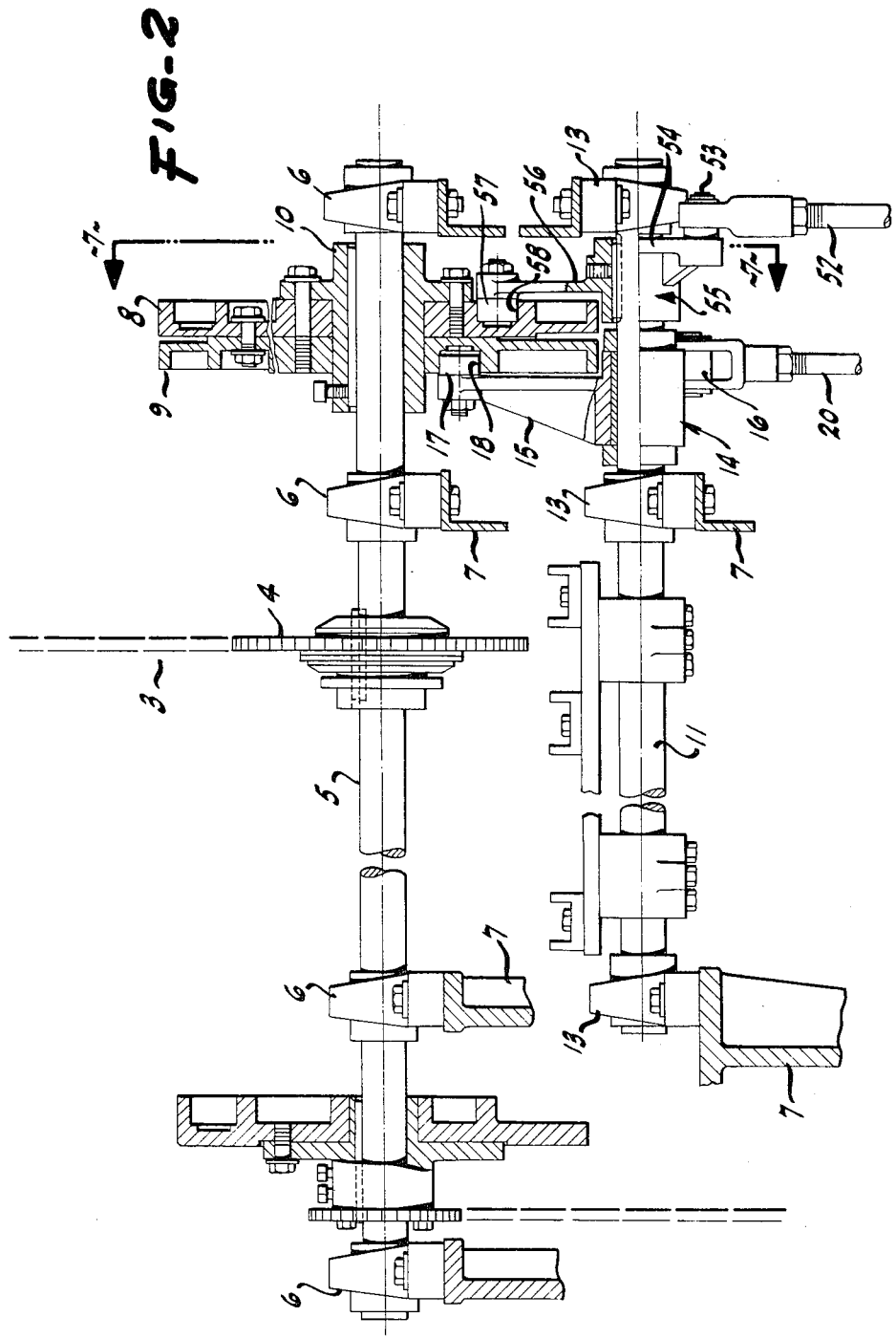

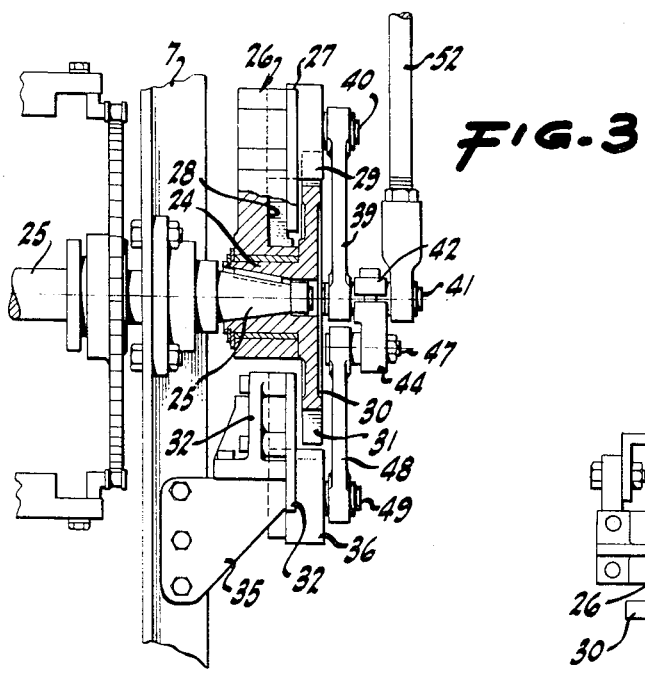

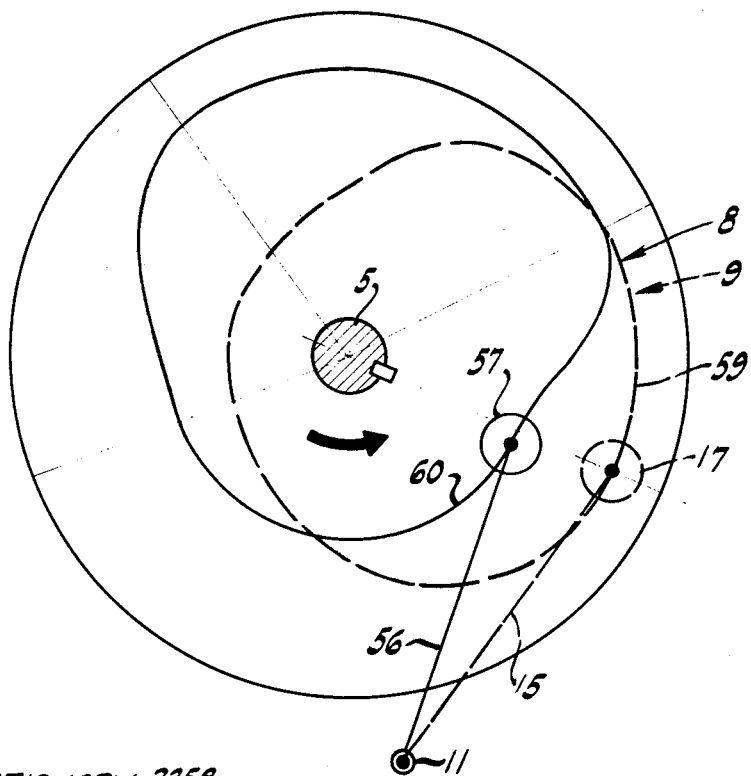

INDEX ASSEMBLY

SUMMARY

Heretofore, index mechanisms, such as the Geneva motion, have been widely employed where an intermittent motion of a driven member is effected during each revolution of a driver, but in such mechanisms rotation of the driven member is limited to a maximum of approximately 90° during each complete revolution of the driving member. Also, in the Geneva motion, the rate of movement of the driven member is normally faster at the beginning and end of each movement.

In its preferred form, the present invention provides an assembly, including a rotatably supported driven index member and a rotatably supported drive means operatively connected for indexing said member over any part of a cycle of said drive means. For example, during each 360° cycle of the drive means, the index member may be rotated through approximately 45° while the driving member is rotated through 135° and the index means may then be stationary during the remaining 225° movement of the 360° cycle of the drive means.

One of the objects of the invention is the provision of an indexing assembly adapted to accomplish the results described in the foregoing paragraph.

Another object of the invention is the provision of an indexing assembly in which control and drive means are supported on a rotatable power-actuatable shaft, while an index member is secured on a driven shaft, and means operably connects said control and drive means with said driven shaft for controlling the duration of movement or movements of said driven shaft and the character of said movement or movements during each 360° cycle of movement of said control and drive means, and said control means includes means for positively locking said index member stationary against rotation in either opposite direction when said index member is stationary and for releasing said index member for rotation when said drive means is actuated for driving said index member.

The control and drive means, and the index member operably connected thereto, enable the index member to be moved one or more times with one or more intervals of rest during each 360° cycle of said control and drive means according to the contour of one of the cams in the system, which cam is readily replaceable in the system to vary said movement, and whenever the indexing member is moved, such movement may be fast or slow, and accelerated and decelerated during such movement.

Other objects and advantages will appear in the description and in the drawings.

BRIEF DESCRIPTION OF DRAWINGS

FIG. 2 is a cross-sectional view, partly in cross section generally along line 2—2 of FIG. 1.

FIG. 3 is a fragmentary, elevational view, partly in cross section, of the indexing assembly as seen from line 3—3 of FIG. 1.

FIG. 4 is a fragmentary part sectional, part top plan view of the portion shown in FIG. 3 taken along line 4—4 of FIG. 1.

FIG. 5 is a cross-sectional view developed along line 5—5 of FIG. 1.

FIG. 6 is a fragmentary elevational view as seen from line 6—6 of FIG. 1.

FIG. 7 is a diagrammatic view of the main cams as seen from line 7—7 of FIG. 2 showing the centerline of the cam track of the near cam in full line, and the centerline of the cam track of the far cam in broken lines, with the cam followers in said tracks respectively indicated in full and broken lines for the near and far followers.

FIG. 8 is a timing diagram for the cams indicated in FIG. 7.

DETAILED DESCRIPTION

Figure 1:
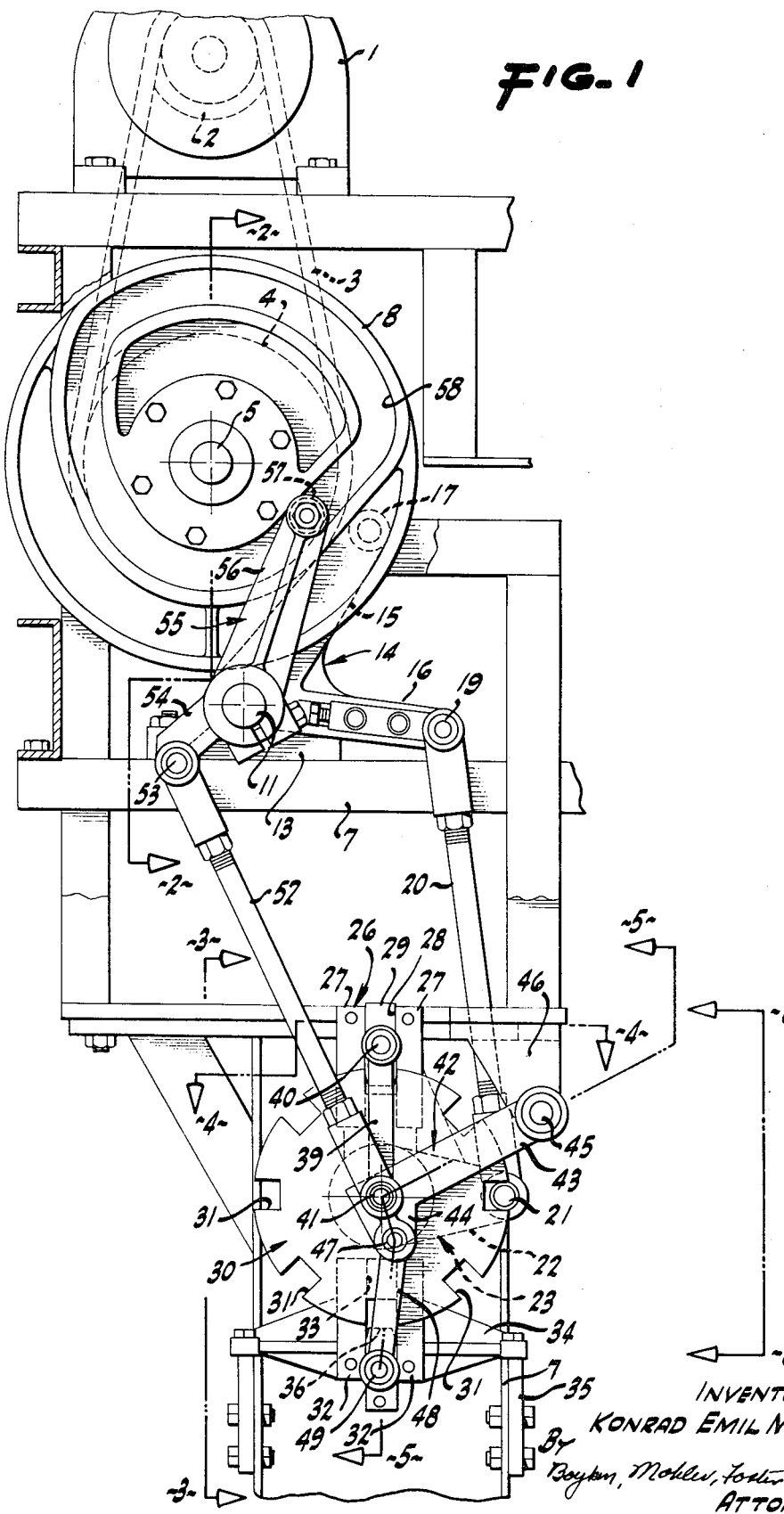
FIG. 1 is a side elevational view of a machine incorporating the present invention, in which the arrangement of the present invention is indicated.

Referring to FIG. 1, a driven shaft from a gear box connected with a motor 1 carries a sprocket wheel 2 that, in turn, is connected by a chain 3 with a sprocket wheel 4 secured on a camshaft 5. Camshaft 5 is supported for rotation in bearings 6 (FIG. 2) carried by frame 7, and a pair of positive motion face or disc cams 8, 9 secured together, back to back, on a sleeve 10 that, in turn, is keyed to shaft 5.

A rocker shaft 11, parallel with shaft 5 and spaced therefrom, is rotatably supported by bearings 13 on frame 7, (FIGS. 2, 3).

A bellcrank, generally designated 14 (FIG. 1), is rotatably supported at the juncture between arms 15, 16 thereof, on said rocker shaft 11. Arm 15 carries a cam follower 17 on the outer end thereof, which follower is confined within the cam track 18 of the cam 9, which cam may be called the "index cam."

Arm 16 of bellcrank 14 is pivotally connected at 19 with the upper end of a connecting rod or index lever 20. The lower end of the index lever 20 is, in turn, pivotally connected at 21 with the outer end of one arm 22 of a bellcrank generally designated 23. The inner end of arm 22 is rotatably supported on the hub 24 (FIG. 3) of an indexing disc, later described in detail, which hub is keyed to an extension of a shaft 25, the latter being rotatably supported in bearings on frame 7. This shaft 25 may have one or more sprocket wheels, gears, or pulleys thereon to transmit the desired indexing motions. The sprocket wheel shown in FIG. 3 is merely illustrative of one power transmission means.

The other arm 26 of crank 23 extends upwardly, as seen in FIG. 1 and includes a pair of parallel, vertically extending, horizontally spaced guide elements 27 providing the opposite sides of a vertically extending open ended, laterally opening guideway 28 for vertical reciprocable movement of an index-engaging plunger 29 into and out of driving engagement with an index member or disc.

Secured on shaft 25 is a circular index disc or plate 30, (FIG. 3) which plate is positioned adjacent to arm 26 of bellcrank 23. Index disc 30 is formed with radially outwardly opening square recesses 31 (FIG. 1) equally spaced around the outer periphery of said disc.

As seen in FIG. 1 the index plunger 29 on arm 26 of crank 23 is in one of said recesses 31 in the index member 30, and upon rotation of crank 14 counterclockwise the crank 23 will also be rotated counterclockwise to rotate the index plate 30 in the same direction through the connection between the plunger 29 and the index member. Thus, shaft 25 will be rotated to the limit of upward movement of connecting rod 20 under the influence of cam 9.

Diametrically across the index disc 30 opposite to the guide plates 27 is a pair of vertically elongated stationary guide plates 32 (FIG. 1) that are parallel with plates 27. Said plates 32 define the sides of a guideway or channel 33 that is in longitudinal alignment with the guideway 28 when the latter is vertical.

Said plates 32 are bolted to a bracket 34 that, in turn, is secured to plates 35 that are bolted to a portion of frame 7 (FIG. 4). A locking plunger 36, similar to the index plunger 29, is vertically reciprocable in the channel 33 between guide plates 32 for reciprocable movement into and out of said channel and into and out of one of the recesses 31 when one of the latter is in vertical alignment with the plunger. In FIGS. 1, 3, the plunger 36 is out of a recess 31.

From the foregoing, it is apparent that the index disc or plate 30 will be positively locked against rotation in either of opposite directions when the locking plunger 36 is in one of the recesses 31.

One end of a link 39 is pivotally connected at 40 to the index plunger 29 while the opposite end of said link is secured on one end of a pin 41 (FIGS. 1, 3). Pin 41, in turn, is carried by a crank generally designated 42, said pin 41 being at the juncture between a generally laterally extending long arm 43 and a short arm 44 of said crank 42, (FIG. 1).

The outer end of the long crank arm 43 is rotatably supported on a pivot 45 that, in turn, is carried by a stationary bracket 46 secured to frame 7 (FIG. 1).

The outer end of the short crank arm 44 is connected by a pivot 47 with the upper end of a link 48. The end of link 48 opposite to pivot 47 is connected by a pivot 49 with the locking plunger 36.

The crank 42 is positioned on the pin 41 between the lower end of link 39 and the lower end of a connecting rod 52 (FIG. 3), which rod, in turn, is pivotally connected at its upper end at 53 with the outer end of a crank arm 54 of a crank 55.

Crank 55 is secured on rocker shaft 11 at the inner adjacent ends of arms 54, 56 of said crank. Arm 56 of crank 55 is adjacent the open side of cam disc 8, which may be called the head cam, and a cam follower 57 on said outer end is in the cam track 58 of said cam 8.

The index cam 9 controls the indexing movement of the index disc 30, and cam 8 controls the reciprocal movements of the plungers 29, 36, both of which cams are secured on camshaft 5.

In FIG. 7 the centerline of cam track 18 of cam 9 is indicated by broken line 59, while the centerline of cam track 58 of the head cam 8 is indicated by unbroken line 60. The outer peripheral outline of the two cams is indicated by a circular unbroken line, and camshaft 5 is in cross section. Thus, line 59 indicates the path of follower 17 in cam 9, while line 60 indicates the path of follower 57 in cam 8. Cams 8, 9 are movable simultaneously in the same direction upon rotation of shaft 5.

FIG. 8 is a timing diagram for cams 8, 9, it being understood that there may be many different cam profiles and changes in the relative proportions of the operating connections between followers 17, 57 and the index disc 30 and plungers 29, 36.

Referring to FIG. 8, during rotation of cams 8, 9 counterclockwise the movement of follower 17 in path 18 through angle 63 of 135° turned through by cam 9 during each cycle of the latter results in rotating the index disc 30 through a 45° angle. The follower 57 that is in cam 8 will, during said movement of the cam through angle 63, be in a position holding locking plunger 36 out of locking engagement with the index disc 30, and will hold the plunger 29 between the guideways 27 on crank arm 23 in a recess 31 in said disc.

At the end of the aforesaid movement through 135°, there is a dwell of the index follower 17 through angle 64 (FIG. 8) of the movement of cam 9 and during this dwell the cranks 55, 42 are actuated by rotation of cam 8 to cause the connecting rod 52 to withdraw the index plunger 29 from the recess 31 in index disc 30 and at the same time to move the locking plunger 36 into a recess 31, whereby the index disc 30 will be positively locked stationary against rotary movement in either one direction or the other.

As soon as plunger 29 is withdrawn from the index disc 30 and plunger 36 is in a recess 3, the index lever 20 connected with crank 23 is returned to the full line position shown in FIG. 3 through angle 65 (FIG. 8) preparatory to the next index movement.

Following the return of the index lever 20 to the position shown in full line in FIG. 1, the cam follower 57 in cam 8 will be actuated by rotation of the latter through angle 66 of the rotation of cam 9 to withdraw the locking plunger 36 and to move the index plunger 29 into a recess 31 in the periphery of the index cam 30. During this movement the cam 9 provides a dwell for follower 17; hence, the index lever 20 is stationary.

At the end of movement of the cams 8, 9 through section 66 (FIG. 8) said cams will have rotated through 360° or a complete cycle, and will be in a position to repeat the movements described.

Figure 9:
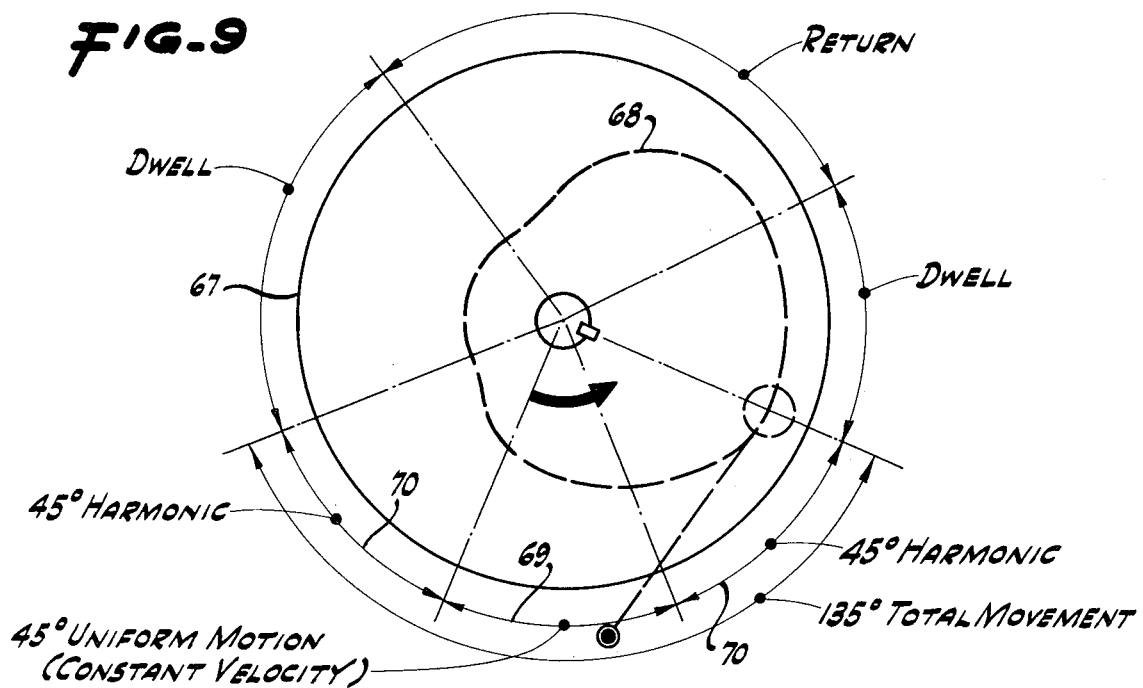
FIG. 9 is a diagrammatic view of an index cam adapted to provide, in each revolution of said cam, a constant velocity of the index disc and shaft between harmonic movement thereof within a total movement of substantially more than a movement of 90° of same cam.

The cam 67 diagrammatically shown in FIG. 9 on a shaft corresponding to shaft 5, has an endless cam track, the center of which is shown in broken line 68, and this cam track is comparable to cam track 18 but provides for a constant velocity rotation of an index disc similar to disc 30 on the index shaft 25 in section 69 between separate harmonic movements of the follower in said cam track causing different rates of movement of disc 30, in sections 70, all of which is within a 135° angle of 360° turned through by the cam 67.

Figure 10:
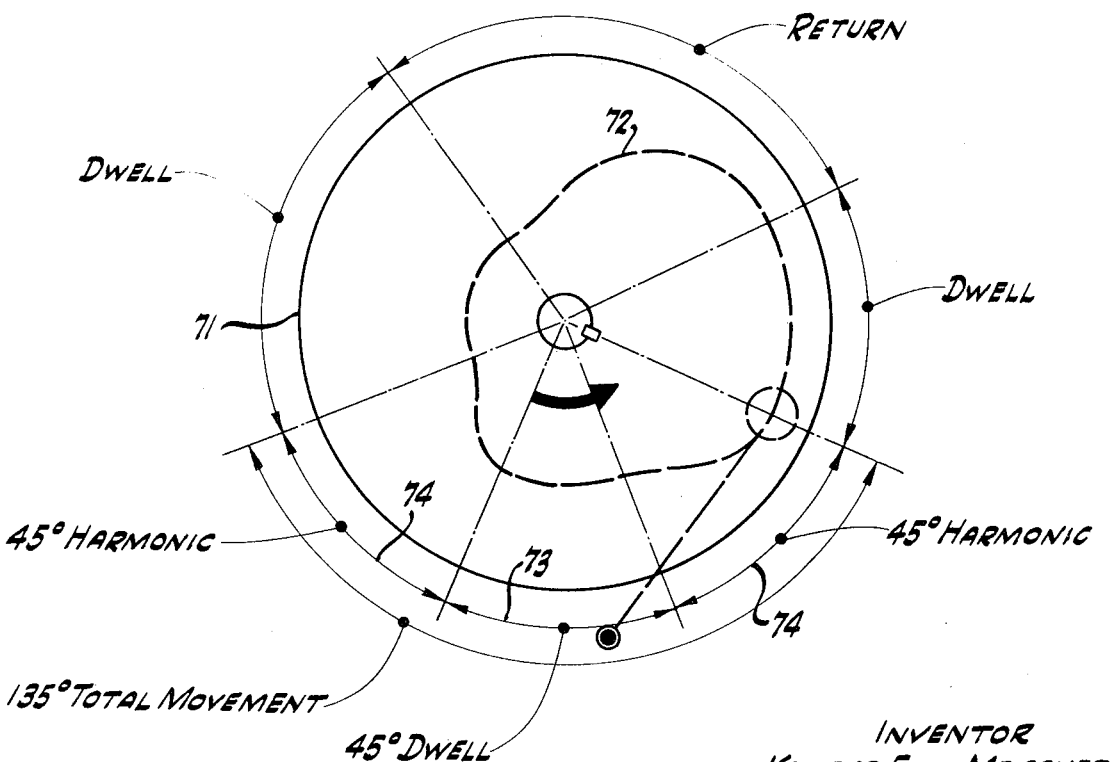
FIG. 10 is a diagrammatic view of an index cam adapted to provide a device of the index disc and shaft between harmonic movements of the latter during substantially more than a 360° movement of the cam.

The cam 71 diagrammatically shown in FIG. 10 on a shaft corresponding to shaft 5, has an endless cam track, the center of which is shown in broken line 72. This cam track is also comparable to the track in cam 9, but provides for a dwell of the cam follower and index disc controlled by its movement in section 73 between harmonic movements of the follower and disc, in sections 74, all within a 135° angle of 360° turned through by the cam within each cycle thereof.

In the arrangement shown in FIGS. 9, 10, it is seen that only cam 9 is changed, and cam 8 may remain as seen in FIG. 7.

I claim:

1. In an index assembly that includes a frame supporting a camshaft and a work shaft for rotation thereon about separate axes, and power means connected with said camshaft for rotating the latter continuously in one direction:
   a. an indexing disc secured on said work shaft for rotation therewith, said indexing disc being formed with an annular row of radially outwardly opening, equally spaced recesses,
   b. an index-actuating cam and an index-locking cam respectively secured on said camshaft for rotation therewith,
   c. an index-locking plunger supported on said frame for reciprocable movement radially of said indexing disc into and out of one of said recesses for positively locking said indexing disc and work shaft against rotation in either of two opposite directions when said index-locking plunger is within one of said recesses, and for freeing said indexing disc and said work shaft for rotation when said index-locking plunger is out of said recess,
   d. an index-moving plunger supported for reciprocable movement into and out of an other of said recesses in said indexing disc,
   e. a first means operatively connecting said index-moving plunger with said index-actuating cam for rotating said indexing disc through a predetermined angle during part only of a revolution of said camshaft when said index-moving plunger is within said other recess and when said index-locking plunger is out of said one of said recesses,
   f. a second means operatively connecting said index-locking cam with said index-locking plunger actuatable for positively moving said index-locking plunger into and out of one of said recesses under the influence of rotation of said index-locking cam, and
   g. control means connecting said first means with said second means operative for simultaneously moving said index-moving plunger and said index-locking plunger radially of said indexing disc in opposite directions at the end of each movement of said camshaft through said part of a revolution of said camshaft and at the end of each 360° revolution of said camshaft for alternately rotating and locking said work shaft during each revolution of said cam shaft.

2. In an index assembly as defined in claim 1;
   h. said first means and said second means including a rock shaft supporting an index-actuating crank and an index-locking crank each having a pair of arms with a cam follower on one arm of each pair respectively in engagement with said index-actuating cam and said index-locking cam for oscillatory movement of said pairs of arms about the axis of said rock shaft under the influence of the contours of said index-actuating cam and said index-locking cam, i. said control means including links respectively pivotally connected with said index-moving plunger and with said index-locking plunger with a crank that pivotally connects with said frame, and a connecting rod pivotally connecting said last-mentioned crank with the other arm of said index-locking crank, for effecting said simultaneous movement of said plungers by actuation of said index-locking cam.